US012332935B2

(12) United States Patent
Vaddamanu et al.

(10) Patent No.: US 12,332,935 B2
(45) Date of Patent: Jun. 17, 2025

(54) MULTICHANNEL CONTENT RECOMMENDATION SYSTEM

(71) Applicant: Adobe Inc., San Jose, CA (US)

(72) Inventors: Praneetha Vaddamanu, Telangana (IN); Nihal Jain, Maharashtra (IN); Paridhi Maheshwari, Madhya Pradesh (IN); Kuldeep Kulkarni, Karnataka (IN); Vishwa Vinay, Karnataka (IN); Balaji Vasan Srinivasan, Karnataka (IN); Niyati Chhaya, Telangana (IN); Harshit Agrawal, Maharashtra (IN); Prabhat Mahapatra, Uttar Pradesh (IN); Rizurekh Saha, West Bengal (IN)

(73) Assignee: Adobe Inc., San Jose, CA (US)

( * ) Notice: Subject to any disclaimer, the term of this patent is extended or adjusted under 35 U.S.C. 154(b) by 378 days.

(21) Appl. No.: 17/862,258

(22) Filed: Jul. 11, 2022

(65) Prior Publication Data

US 2024/0012849 A1 Jan. 11, 2024

(51) Int. Cl.
| | |
|---|---|
| *G06F 16/532* | (2019.01) |
| *G06F 16/535* | (2019.01) |
| *G06V 10/56* | (2022.01) |
| *G06V 10/74* | (2022.01) |
| *G06V 10/774* | (2022.01) |
| *G06V 10/82* | (2022.01) |
| *G06V 20/30* | (2022.01) |

(52) U.S. Cl.
CPC .......... *G06F 16/532* (2019.01); *G06F 16/535* (2019.01); *G06V 10/56* (2022.01); *G06V 10/761* (2022.01); *G06V 10/774* (2022.01); *G06V 10/82* (2022.01); *G06V 20/30* (2022.01)

(58) Field of Classification Search
CPC ...... G06F 3/038; G06F 3/03543; G06F 3/023; H01R 13/2421; H01R 13/6205; H01R 2201/06
USPC ........................................................ 358/157
See application file for complete search history.

(56) References Cited

U.S. PATENT DOCUMENTS

| | | | | |
|---|---|---|---|---|
| 6,421,675 | B1 * | 7/2002 | Ryan | G06F 16/30 |
| 7,908,183 | B2 * | 3/2011 | Jacobi | G06Q 30/0633 |
| | | | | 705/26.7 |

(Continued)

OTHER PUBLICATIONS

Agarap, A. F. M., "Deep Learning using Rectified Linear Units (ReLU)", arXiv:1803.08375v2, Feb. 7, 2019, 7 pages.

(Continued)

*Primary Examiner* — Negussie Worku
(74) *Attorney, Agent, or Firm* — Nicholson De Vos Webster & Elliott LLP

(57) ABSTRACT

Embodiments are disclosed for multichannel content recommendation. The method may include receiving an input collection comprising a plurality of images. The method may include extracting a set of feature channels from each of the images. The method may include generating, by a trained machine learning model, an intent channel of the input collection from the set of feature channels. The method may include retrieving, from a content library, a plurality of search result images that include a channel that matches the intent channel. The method may include generating a recommended set of images based on the intent channel and the set of feature channels.

20 Claims, 10 Drawing Sheets

(56) References Cited

U.S. PATENT DOCUMENTS

| | | | | |
|---|---|---|---|---|
| 8,763,148 | B2* | 6/2014 | Hyde | G06F 21/79 |
| | | | | 726/26 |
| 8,799,220 | B2* | 8/2014 | O'Malley | G06Q 20/203 |
| | | | | 707/694 |
| 9,087,271 | B2* | 7/2015 | Chechik | G06F 16/58 |
| 10,248,994 | B2* | 4/2019 | Grosz | H04N 1/00196 |
| 11,423,106 | B2* | 8/2022 | Paris | G06F 16/9536 |
| 11,704,893 | B2* | 7/2023 | Ren | G06V 10/454 |
| | | | | 386/241 |
| 11,947,586 | B2* | 4/2024 | Sun | G06F 16/7834 |
| 11,989,922 | B2* | 5/2024 | Farre Guiu | G06N 3/08 |
| 2006/0235855 | A1* | 10/2006 | Rousseau | G06F 16/48 |
| 2007/0294240 | A1* | 12/2007 | Steele | G06F 16/338 |
| | | | | 707/999.005 |
| 2012/0254310 | A1* | 10/2012 | Kamimaeda | G06F 16/437 |
| | | | | 709/204 |
| 2015/0161485 | A1* | 6/2015 | Chechik | G06F 16/583 |
| | | | | 382/159 |
| 2015/0262069 | A1* | 9/2015 | Gabriel | G06F 16/9535 |
| | | | | 706/48 |
| 2015/0293995 | A1* | 10/2015 | Chen | H04N 21/237 |
| | | | | 707/706 |
| 2019/0087691 | A1* | 3/2019 | Jelveh | G06N 3/084 |
| 2021/0264210 | A1* | 8/2021 | Ueta | G06F 18/2148 |

OTHER PUBLICATIONS

Chen, H., et al., "Less is More: Probabilistic Models for Retrieving Fewer Relevant Documents", Proceedings of the 29th annual international ACM SIGIR conference on Research and development in information retrieval, Aug. 2006, 8 pages.

Chen, Y., et al., "Image Search with Text Feedback by Visiolinguistic Attention Learning", Proceedings of the IEEE/CVF Conference on Computer Vision and Pattern Recognition (CVPR), 2020, pp. 3001-3011.

Clarke, C. L. A., et al., "Novelty and Diversity in Information Retrieval Evaluation", Proceedings of the 31st annual international ACM SIGIR conference on Research and development in information retrieval, Jul. 2008, 8 pages.

Daunhawer, I., et al., "Self-supervised Disentanglement of Modality-specific and Shared Factors Improves Multimodal Generative Models", 42nd DAGM German Conference, DAGM GCPR 2020, Sep. 2020, pp. 1-15.

Dou, Z., et al., "Multi-dimensional Search Result Diversification", Proceedings of the fourth ACM international conference on Web search and data mining, Feb. 2011, pp. 475-484.

Eastwood, C., et al., "A Framework for the Quantitative Evaluation of Disentangled Representations", ICLR 2018 Conference Blind Submission, 2018, pp. 1-15.

Hazarika, D., et al., "MISA: Modality-Invariant and- Specific Representations for Multimodal Sentiment Analysis", Proceedings of the 28th ACM International Conference on Multimedia, Oct. 2020, 12 pages.

He, K., et al., "Deep Residual Learning for Image Recognition", Proceedings of the IEEE Conference on Computer Vision and Pattern Recognition (CVPR), 2016, pp. 770-778.

Hu, S., et al., "Search Result Diversification Based on Hierarchical Intents", Proceedings of the 24th ACM International on Conference on Information and Knowledge Management, Oct. 2015, pp. 63-72.

Kingma, D. P., et al., "Adam: A Method for Stochastic Optimization", arXiv:1412.6980v9, Jan. 30, 2017, pp. 1-15.

Krizhevsky, A., et al., "ImageNet Classification with Deep Convolutional Neural Networks", NeurIPS Proceedings, 2012, pp. 1-9.

Li, Y., et al., "A Survey of Multi-View Representation Learning", IEEE Transactions on Knowledge and Data Engineering, vol. 31, No. 10, Oct. 1, 2019, pp. 1-20.

Liu, Z., et al., "Image Retrieval on Real-life Images with Pre-trained Vision-and-Language Models", ImarXiv:2108.04024v1, Aug. 9, 2021, 20 pages.

Lu, J., et al., "ViLBERT: Pretraining Task-Agnostic Visiolinguistic Representations for Vision-and-Language Tasks", arXiv:1908.02265v1, Aug. 6, 2019, 11 pages.

Ma, H., et al., "Diversifying Query Suggestion Results", Proceedings of the Twenty-Fourth AAAI Conference on Artificial Intelligence (AAAI-10), vol. 24, No. 1, 2010, pp. 1399-1404.

Maheshwari, P., et al., "Learning Colour Representations of Search Queries", SIGIR '20: Proceedings of the 43rd International ACM SIGIR Conference on Research and Development in Information Retrieval, Jul. 2020, pp. 1389-1398.

Maheshwari, P., et al., "Scene Graph Embeddings Using Relative Similarity Supervision", Proceedings of the AAAI Conference on Artificial Intelligence, vol. 35, No. 3, Apr. 6, 2021, 9 pages.

Radenovic, F., et al., "Deep Shape Matching", CVF, Jul. 25, 2018, pp. 1-17.

Radford, A., et al., "Learning Transferable Visual Models From Natural Language Supervision", Proceedings of Machine Learning Research, vol. 139, Feb. 26, 2021, pp. 1-48.

Rodrygo, L. T. S., et al., "Search Result Diversification", Foundations and Trends (Registered) in Information Retrieval, vol. 9, No. 1, Mar. 5, 2015, 38 pages.

Ruta, D., et al., "ALADIN: All Layer Adaptive Instance Normalization for Fine-grained Style Similarity", Proceedings of the IEEE/CVF International Conference on Computer Vision (ICCV), Mar. 17, 2021, 10 pages.

Smith, J. R., et al., "VisualSEEk: a fully automated content-based image query system", Proceedings of the fourth ACM international conference on Multimedia, 1997, pp. 87-98.

Tan., H., et al., "LXMERT: Learning Cross-Modality Encoder Representations from Transformers", Proceedings of the 2019 Conference on Empirical Methods in Natural Language Processing and the 9th International Joint Conference on Natural Language Processing, 2019, pp. 5100-5111.

Tian, Y., et al., "Contrastive Multiview Coding", European Conference on Computer Vision, 2020, pp. 776-794.

Tsai, Y. H. H., et al., "Learning Factorized Multimodal Representations", Published as a conference paper at ICLR 2019, May 14, 2019, pp. 1-20.

Tschannen, M., et al., "On Mutual Information Maximization for Representation Learning", arXiv:1907.13625, 2020, Jan. 23, 2020, pp. 1-16.

Vo., N., et al., "Composing Text and Image for Image Retrieval—an Empirical Odyssey", Proceedings of the IEEE/CVF Conference on Computer Vision and Pattern Recognition (CVPR), 2019, pp. 6439-6448.

Wang, S., et al., "Cross-modal Scene Graph Matching for Relationship-aware Image-Text Retrieval", Proceedings of the IEEE/CVF Winter Conference on Applications of Computer Vision (WACV), Oct. 11, 2019, 12 pages.

Wilber, M., et al., "BAM! The Behance Artistic Media Dataset for Recognition Beyond Photography", Proceedings of the IEEE International Conference on Computer Vision (ICCV), Jul. 9, 2017, pp. 1202-1211.

Zhao, J., et al., "Multi-view learning overview: Recent Progress and New Challenges", Information Fusion, vol. 38, Nov. 14, 2017, pp. 43-54.

Zhu, Y., et al., "Learning for Search Result Diversification", SIGIR '14: Proceedings of the 37th international ACM SIGIR Conference on Research & Development in Information Retrieval, Jul. 2014, pp. 293-302.

* cited by examiner

MULTICHANNEL CONTENT RECOMMENDATION SYSTEM

BACKGROUND

Content libraries provide a useful resource for content creators. For example, content libraries may be used to find content to be incorporated into a new project or serve as inspiration to create new content. Given the wide variety of content available, finding the desired content for a particular task or application can be challenging. Content recommendation systems attempt to assist users by surfacing relevant content, however the variety of options available for searching a content library can make searching and returning relevant results difficult. Additionally, the ability to effectively search a content library has become a specialized skill. Often, a single image search returns images that all look similar and lack diversity, while a text search is heavily dependent on the search terms used and may not capture all the elements the user intended to search. Such search results produced by these approaches are typically inadequate, leading to a frustrating user experience.

SUMMARY

Introduced here are techniques/technologies that relate to generating content recommendations from a collection of input content. The collection of input content includes multiple images. The multichannel content recommendation system extracts channel information from each image in the collection of input content. The channel information is used to generate an intent channel for the collection of input content. The multichannel content recommendation system manipulates the channels to reduce channel overlap while preserving some shared information across the channels. A search of a content library is performed using a narrow band of values for the intent channel and variable values for the non-intent channels. The resulting search returns a diversified set of search results along some channels without losing a focus of the search using the intent channel. As an example, the user may provide a moodboard including photographs of dogs and a moodboard of various images that use watercolors. The system identifies a "dog" object channel and a "watercolor" style channel and uses this information to search for watercolor images that include dogs from the asset library.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which.

DETAILED DESCRIPTION

Figure 1:
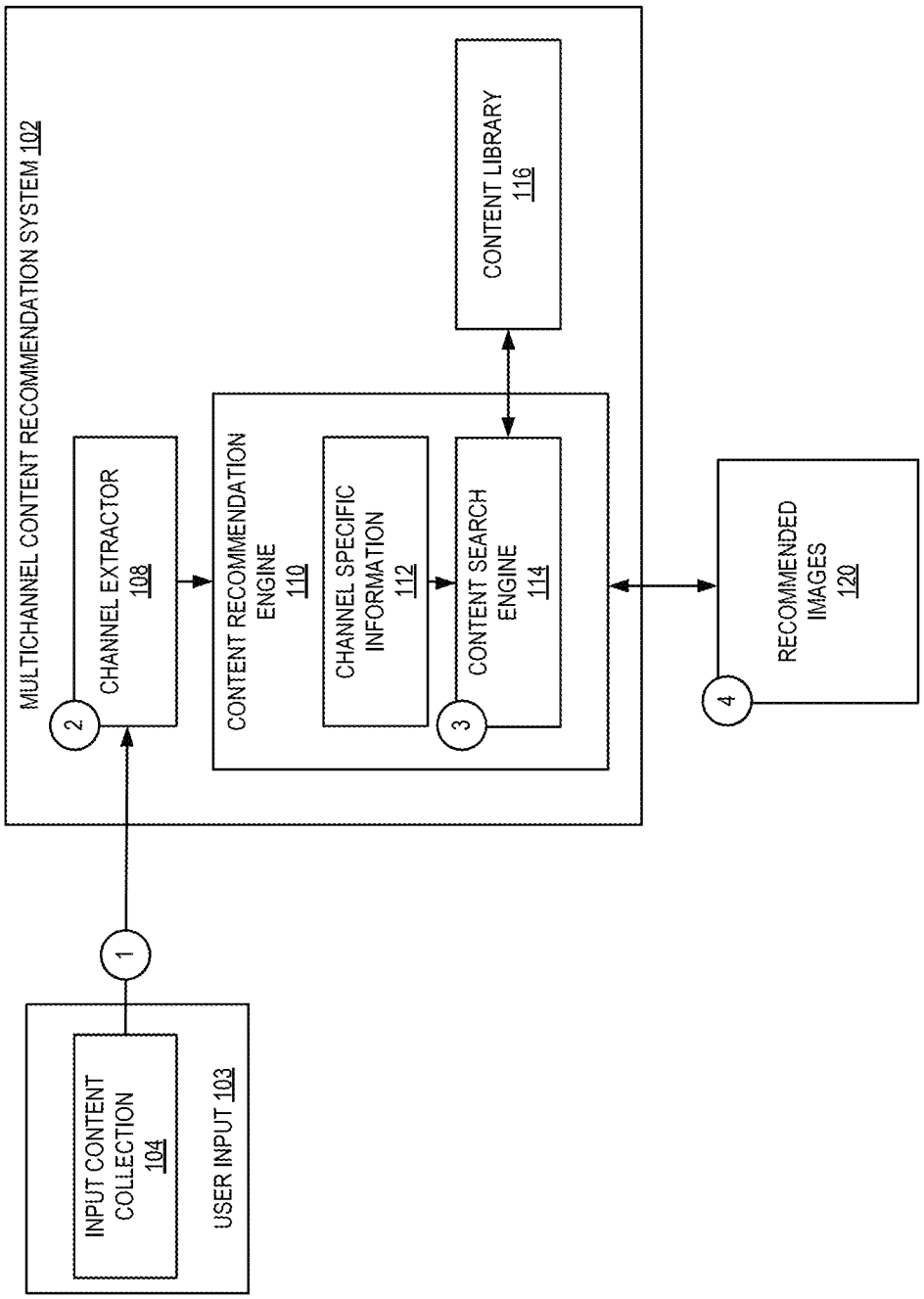
FIG. 1 illustrates a diagram of a process of multichannel content recommendation in accordance with one or more embodiments.

One or more embodiments of the present disclosure include a multichannel content recommendation system that generates content recommendations for one or more collections of input images. Common content recommendation techniques train models to focus on aligning common aspects of images to a single representative image that can be used to perform a search. However, this limits the search results because large amounts of features that are not common between images are discarded.

Conventional approaches lack the ability to utilize channel specific information or identify an intent channel. Instead, such approaches include a wide set of available methods for a text-to-image retrieval task that allows a user to provide feedback in the form of text, continually refining the returned results. The training of these models on a large set of image and text pairs focuses on aligning the different representations (e.g., word, image attribute, etc.) to common aspects. Thus, conventional techniques do not generate diverse search results using channel specific information but rather align the common information between channels during the search.

To address these and other deficiencies in conventional approaches, embodiments determine an intent channel of a set of images, and perform a search based on a homogenous intent channel and diverse values for the other channels. The intent channel is determined by using a weight of each channel, with greater weights having a higher likelihood that the corresponding channel indicates the intent of the images in the input collection. The search is performed by the multichannel content recommendation system and returns a set of results that is clustered around the intent channel such as an object channel while benefiting from diversity of other channels such as style or color palette. In some embodiments, two sets of images can be searched and an intent channel for each set of images can be determined. In these cases, the search result includes images that represent the intent channels of both sets of images, such as an object and a color palette, while diversity is maintained on a style channel. This provides searches based on one or more sets of images and provides a robust system for content recommendation to the user. Although embodiments are generally described with respect to sets of images, embodiments may be used with animation, graphic editing, or other content that includes identifiable channels.

The intent channel (e.g., a visual aspect) is identified from a group of images enabling the search to be diversified along other channels. The intent channel is identified by extracting channel specific information from collections of input images and is identified as more significant in the group of images than any other channels. A search of a content library is performed using a substantially constant intent channel value and variable values for the other channels. By diversifying the values of other channels, a broader and more diverse set of recommended images is returned in the search results.

In some embodiments, the multichannel content recommendation system receives an input collection including multiple images. The input collection can include a number of images selected by a user to discover recommended images using the input collection to search a content library. A feature extractor identifies a set of feature channels of the input collection with each image having one or more channels. The multichannel content recommendation system can include a trained machine learning model that determines an intent of the input collection by computing weights of each channel across the input collection. The trained machine learning model selects the channel having the greatest weight as the intent channel of the input collection for the purpose of performing a search of the content library. A content library is searched by using a constant value of the intent channel to cluster the search results around the intent channel and using variable values of the other channels to provide a diverse set of search results. The multichannel content recommendation system returns a set of recommended images that match the intent channel and have variation on other channels. By leveraging the machine learning model to determine the intent channel, the multichannel content recommendation system provides a more diverse search results because the intent channel provides a clustering of results relating to a particular channel such as an object, while the other channels can be diversified when performing the search such as color or style.

FIG. 1 illustrates a diagram of a process of multichannel content recommendation in accordance with one or more embodiments. As depicted in FIG. 1, a multichannel content recommendation system 102 includes a channel extractor 108, a content recommendation engine 110, and a content library 116. The content recommendation engine 110 includes channel specific information 112 and content search engine 114.

At numeral 1, the multichannel content recommendation system 102 receives a user input 103 identifying an input content collection 104. The input content collection 104 includes one or more images such as images, graphic art, or other visual content. The multichannel content recommendation system 102 receives the input content collection 104. The images can be any known type of electronic file that contains graphic information including but not limited to: JPG, .TIFF, .BMP, or other image files. The input content collection 104 may include images from a content server, or uploaded from a client device of the user, such as by a user interface. In some embodiments, the user input 103 is an identifier such as a file location, a collection ID in a cloud storage, or a resource locator (e.g., URL) that identifies a location of the input content collection 104.

At numeral 2, the channel extractor 108 generates multiple channels for each image of the input content collection 104. The channel extractor may include one or more machine learning models that extract channels from each image in the input content collection. Examples of channels include an object, a style, and a color palette. The channel extractor 108 manipulates the channels to separate information from each channel of the image. In one example, the channels are separated by applying an orthogonalization process that differentiates the visual information represented by each channel. In some embodiments, a trained machine learning model such as a neural network is used to generate channel specific features from the input content collection. Each of the channel specific features is an orthogonalized representation of the feature channels. The channel extractor 108 outputs the channel specific information 112 to the content recommendation engine 110.

In some embodiments, the channel extractor 108 can include one or more machine learning models as pretrained features extractors trained to determine a specific type of feature. In one embodiment, a residual neural network, such as ResNet, is trained for an object detection task. The multichannel content recommendation system determines that embeddings of the residual neural network from its penultimate layer can be used to represent the object channel. Because the residual neural network is trained for object detection, images of the input content collection 104 with similar embeddings contain similar objects.

To represent the style of images, the channel extractor 108 can use a second pretrained neural network, such as an all-layer adaptive instance normalization model (ALADIN) trained to retrieve images based on artistic style similarity. The channel extractor 108 determines that images with embeddings of the ALADIN network that are similar include similar styles of visual content.

The channel extractor 108 can also determine a color palette for each image of the input content collection 104. The channel extractor 108 can utilize the LAB space for each image of the input content collection 104, with the 'L.' corresponding to lightness/luminance and the other two channels representing chrominance. The channel extractor 108 generates a color embedding by binning the range of L, A and B values into bins of a predetermined width and computing a histogram over a fraction of pixels containing a particular LAB value. By generating a histogram, the channel extractor 108 produces embeddings that are perceptually uniform. In this case, perceptually uniform is indicated by distances in the LAB space that correspond to similar visually perceived changes in color.

In one example, the channel extractor 108 generates a collection representation of the channel specific information. The channel extractor 108 manipulates each channel to separate the visual information represented by each channel. For instance, the channel extractor 108 performs an orthogonalization for each channel and computes a mean of each channel for the input content collection 104. The collection representation has the same dimensions as the number of channels for each image, which allows comparison between additional input content collections.

The channel extractor 108 outputs the channel specific information 112 including the collection representation to the content recommendation engine 110. The content recommendation engine 110 can compute an intent channel of the channel specific information 112 by computing a similarity of the channel specific information 112 along each channel of the collection. The channel specific information 112 may indicate that the object channel includes visual content of a blue truck because the similarity between the object channel of the images has a greater similarity than other channels.

At numeral 3, the content recommendation engine 110 generates a search query from the channel specific information. The content recommendation engine 110 provides the search query including one or more intent channels to the content search engine 114. The content search engine 114 retrieves a result set of images from the content library 116 based on the search query. The content search engine 114 uses the collection representation to perform the search. In some examples, the content search engine 114 uses two collection representations each including an intent channel to perform the search. In order to retrieve the result set of images, the content search engine 114 retrieves a set of candidate images that each have a set of candidate feature channels. The content search engine 114 compares the intent channel with the set of candidate feature channels of the candidate images. The content search engine 114 can filter the candidate images by comparing feature channels of the collection representation with the candidate feature channels of the candidate images. The content search engine 114 selects one or more recommended images based on the comparison of the intent channel with the candidate feature channels.

At numeral 4, the content recommendation engine 110 generates a set of recommended images 120. The set of recommended images 120 includes one or more images from the content library 116. The set of recommended images 120 can be presented to the user via a user interface or stored in a cache or non-volatile memory device.

Figure 2:
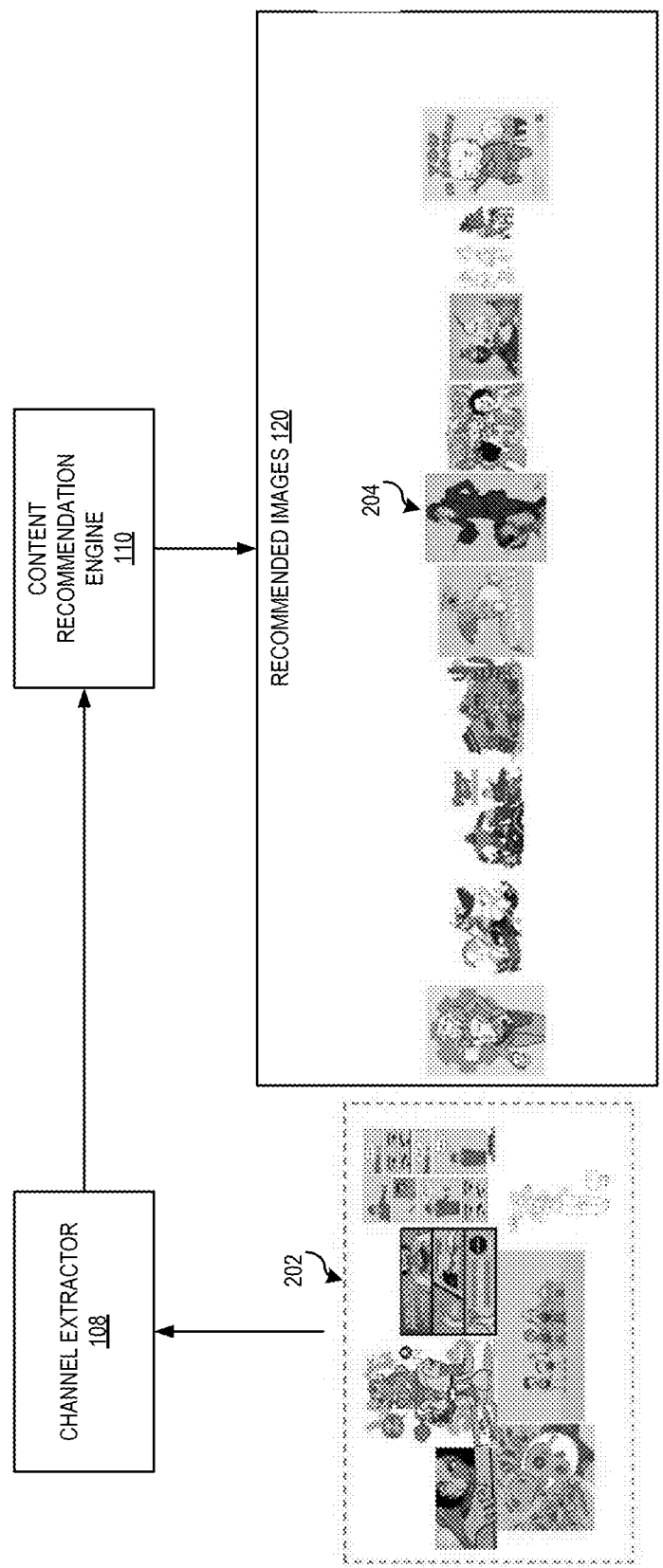
FIG. 2 illustrates an example of generating an intent channel and performing a search based on an input collection in accordance with one or more embodiments.

FIG. 2 depicts an example of generating an intent channel and performing a search based on an input collection in accordance with one or more embodiments. An input content collection 202 includes seven images depicting various scenes of cartoon style images. The channel extractor 108 determines that the style channel is the intent channel and the content recommendation engine 110 returns recommended images 120 including a result set 204 that includes cartoon images with varying color palettes and different objects in the images. As illustrated by FIG. 2, the result set 204 clusters around the intent channel by focusing the result set 204 on images with a cartoon style. The result set 204 is also diversified with respect to the object and color channels by including a variety of color palettes and objects in the images with the cartoon style.

Figure 3:
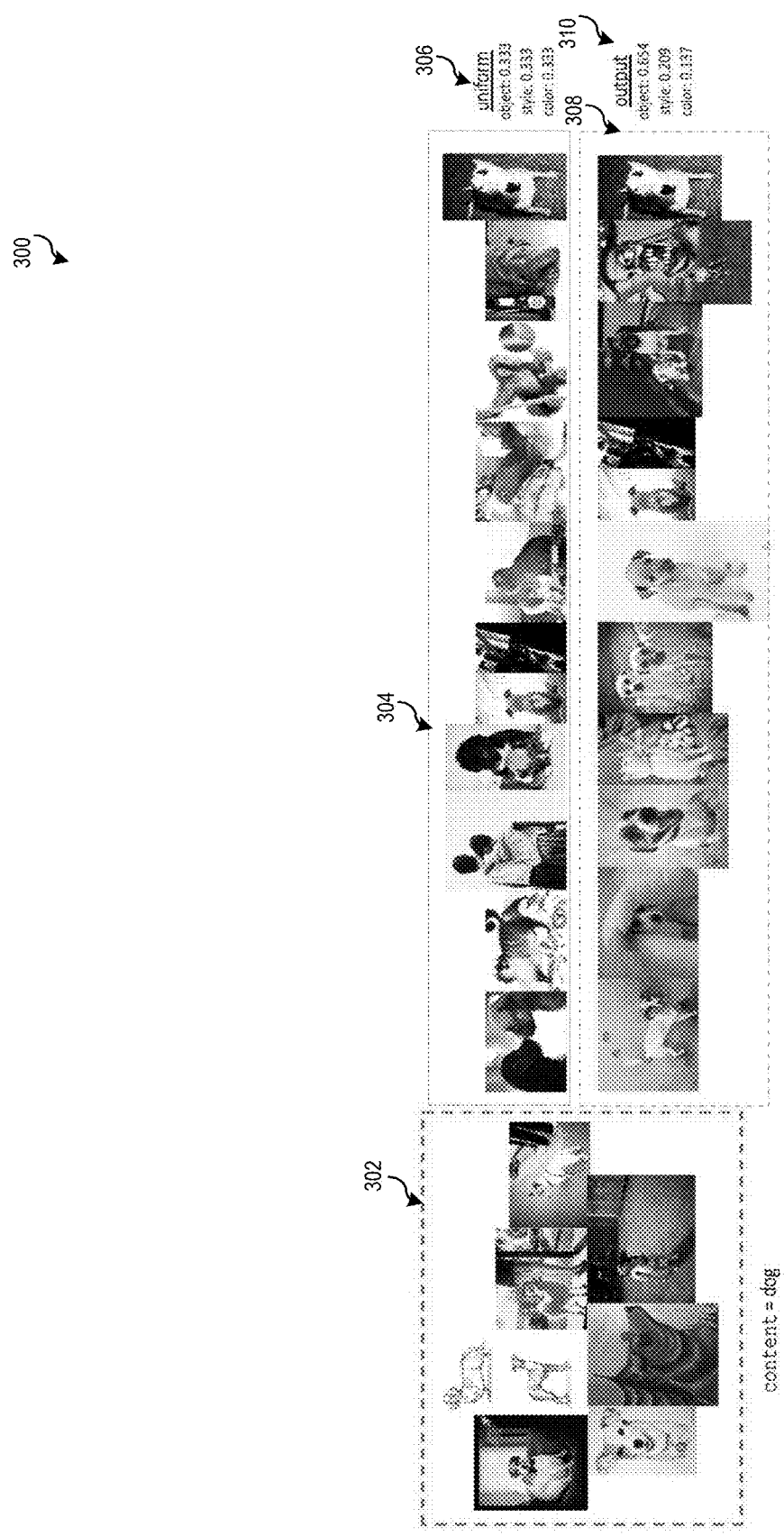
FIG. 3 illustrates a comparison of a uniform channel weighting and multichannel content recommendation using a channel specific weighting in accordance with one or more embodiments.

FIG. 3 illustrates a comparison of a uniform channel weighting and multichannel content recommendation using a channel specific weighting in accordance with one or more embodiments. The multichannel content recommendation system receives input content collection 302. As illustrated in FIG. 3, the input content collection 302 includes images containing dogs in various colors and styles.

In a first example with uniform channel weights 306, which in this example are 0.333 for the object channel, 0.333 for the style channel, and 0.333 for the color channel, a content recommendation system returns result set 304. The result set 304 includes images with objects that include dogs, cats, children, a bird, and a monkey. The result set 304 includes images that are all a homogenous grayscale color palette, and all are photograph style images. This result set 304 illustrates the challenge to designers trying to search for images similar to the input content collection 302.

In a second example, with channel specific weights 310, which in this example are 0.654 for the object channel, 0.209 for the style channel, and 0.137 for the color channel, the multichannel content recommendation system generates the result set 308. As described above, the channel specific weights 310 are computed as a collection representation of the input content collection 302. The content search engine performs a search with the channel specific weights and returns the result set 308 that includes dogs and one image of a cat with varied color palettes, and styles. As clearly shown by FIG. 3, the result set 308 is both more focused on the object of a dog as well as more diverse on color palette and style than the result set 304.

Figure 4:
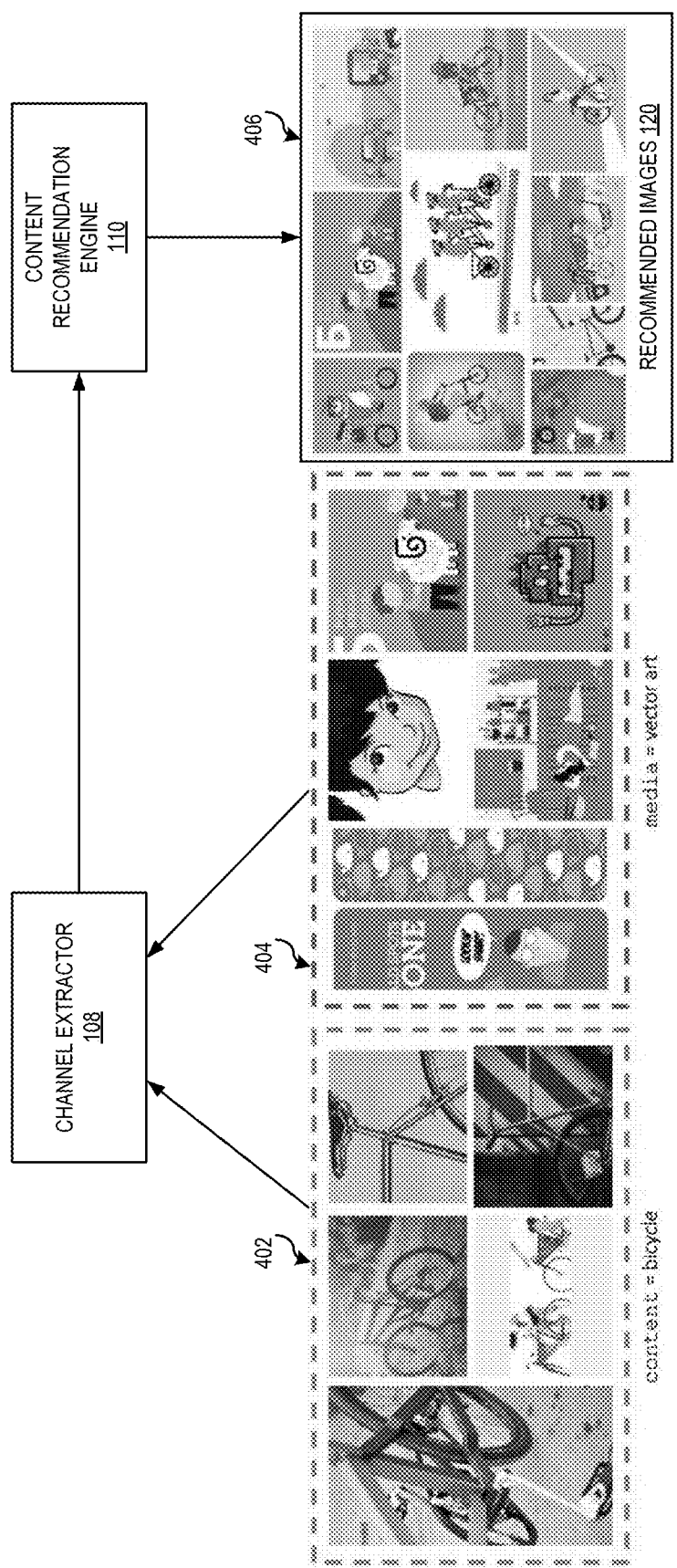
FIG. 4 depicts an example of multichannel content recommendation including more than one collection of input content in accordance with some embodiments.

FIG. 4 depicts an example of multichannel content recommendation including more than one collection of input content in accordance with some embodiments. The channel extractor 108 receives a first input content collection 402 and a second input content collection 404. The first input content collection 402 and the second input content collection 404 are processed by the channel extractor to produce channel specific information for each of the first input content collection 402 and the second input content collection 404. A collection representation for each of the first input content collection 402 and the second input content collection 404 is computed by the channel extractor and an intent channel is determined for each input content collection. As depicted in this example, the first input content collection 402 has an intent channel of object (represented by a content attribute) and the object represented corresponds to a bicycle. The second input content collection 404 has an intent channel of style (represented by a media attribute) and the style represents vector art.

The channel extractor 108 provides the channel specific information to the content recommendation engine 110. The content recommendation engine 110 performs a search of the content library for images that include bicycles in a vector art style, with variable color palettes. A set of recommended images 120 including a result set 406 that contain bicycles, have a vector art style, and have varied color palettes is returned by the content recommendation engine 110.

Figure 5:
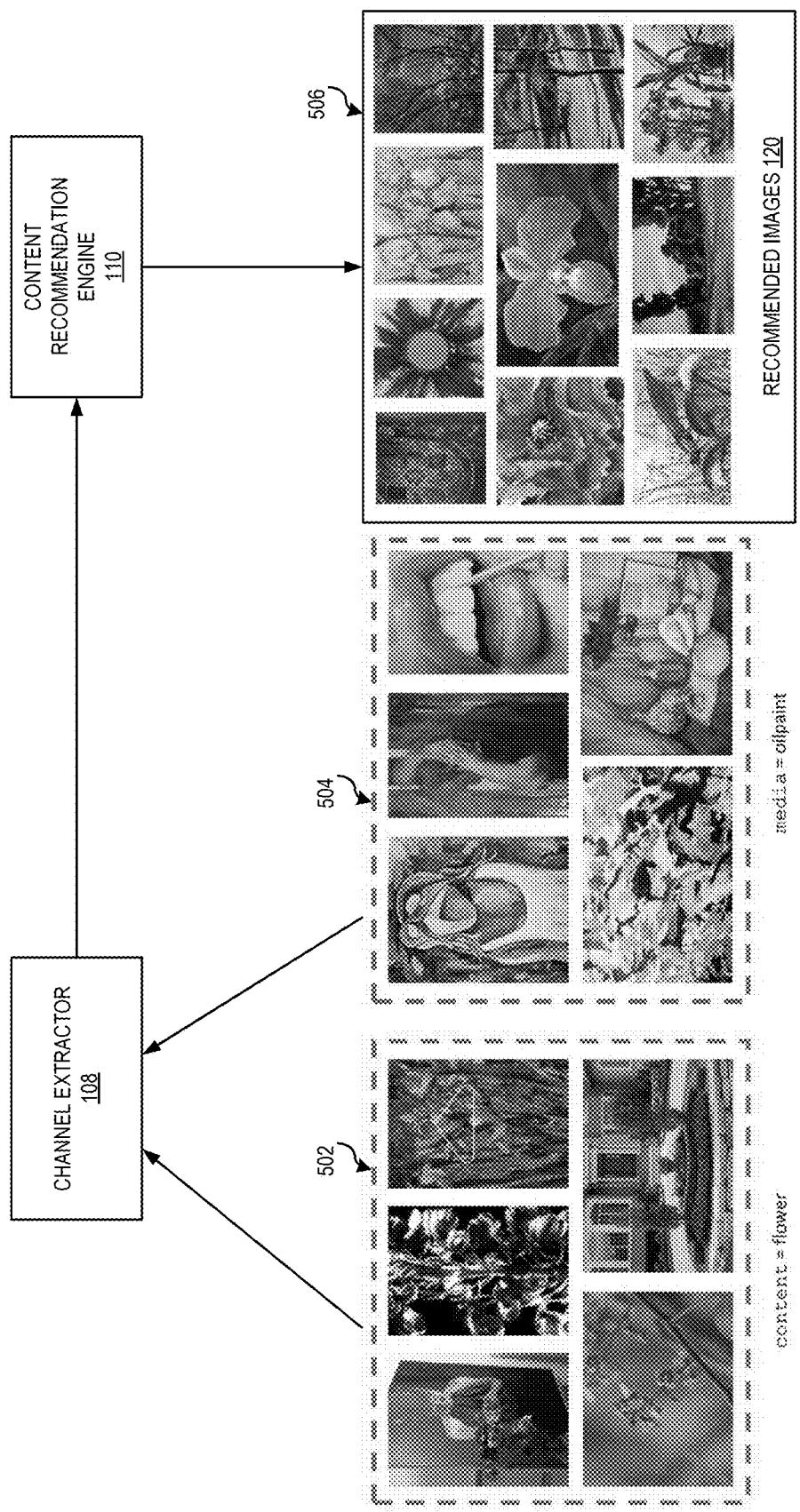
FIG. 5 illustrates another example of multichannel content recommendation including more than one collection of input content in accordance with one or more embodiments.

FIG. 5 illustrates another example of multichannel content recommendation including more than one collection of input content in accordance with one or more embodiments. In this example, the channel extractor receives a first input content collection 502 and a second input content collection 504. The first input content collection 502 and the second input content collection 504 are processed as described above by the channel extractor 108. A collection representation for each of the first input content collection 502 and the second input content collection 504 is computed and an intent channel determined for each of the input content collections. Notably, in the first input content collection 502, the images include multiple objects such as a coat hanger, a person, a house, and a branch. The channel extractor 108 computes the collection representation which provides an accommodation for a diverse input set that contain different objects, but also contain a common object of a flower. By computing the collection representation for each channel, the intent can be determined by the channel extractor 108 as the object channel (i.e., a content attribute) and the intended object is a flower. The second input content collection 504 has an intent channel of style (represented by a type of media) and the style represents an oil paint style of image. The intent channels are provided to the content recommendation engine 110 by the channel extractor 108 and a set of recommended images including a result set 506 is returned. In this example, the content recommendation engine 110 performs a search of the content library for images that include flowers (object intent) in an oil paint style (type of media intent), with variable color palettes. The result set 506 includes images that cluster the channels of oil paint flowers with a diversity on the color channel.

Figure 6:
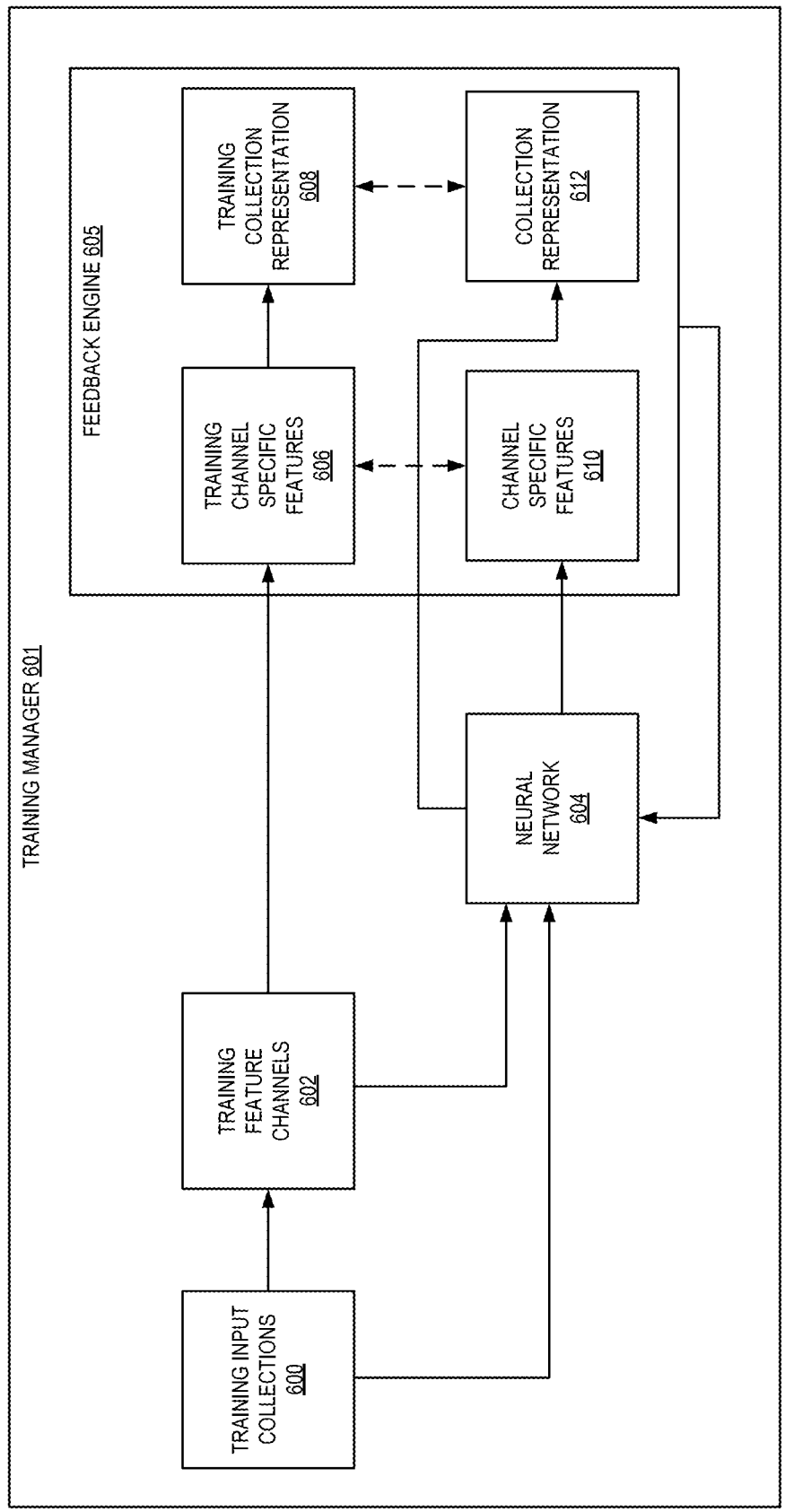
FIG. 6 illustrates a training process of a neural network of a multichannel content recommendation system in accordance with one or more embodiments.

FIG. 6 depicts a process of training a neural network for multichannel content recommendation in accordance with one or more embodiments. As discussed above, embodiments use a neural network to generate an intent channel and channel specific features from an input set of images. To do this, the neural network needs to be trained to accurately map channel specific features and intent channels. As shown in FIG. 6, training may be performed by a training manager 601 using training input collections 600 and training feature channels 602. In some embodiments, the training input collections 600 may be any form of digital media, such as digital images that include multiple channels of visual information. The training input collection 600 may be labeled with channel weights for each channel of a training image. The training input collections 600 can also include labels for each channel such as an object label, an art style label, or a color palette label. One or more feature vectors that correspond to the visual aspects of each image are be used to represent training input collections 600. The training manager 601 may train the neural network 604 to learn a set of machine learning weights to compute the channel specific features 610 from each image of the training input collections 600 and training feature channels 602 for each image. The channel specific features 610 represent a weighted set feature channels for each image in an input collection and may be output to feedback engine 605. The set of training channel specific features 606 for each image is compared with the channel specific features 610 to train the machine neural network to generate weighted feature channels for images. The neural network 604 can generate a collection representation 612 from the training input collections 600 and the training feature channels 602. An example of the collection representation 612 is a set of feature values that have weights such as [0.5, 0.1, 0.4]=[object, style, color] that represent an average of the channel specific features of each image in the training input collection. The training manager 601 can further include a feedback engine 605 that compares the training collection representation 608 with the collection representation 612 generated by the neural network 604 and the values of training channel specific features 606 and the values of channel specific features generated by the neural network 604. The feedback engine 605 provides information, such as loss information based on a difference between the collection representation 612 and a set of feature values of the training collection representation 608 or a difference between the values of training channel specific features 606 and the values of channel specific features 610, to the neural network 604 to facilitate learning of the neural network 604.

Figure 7:
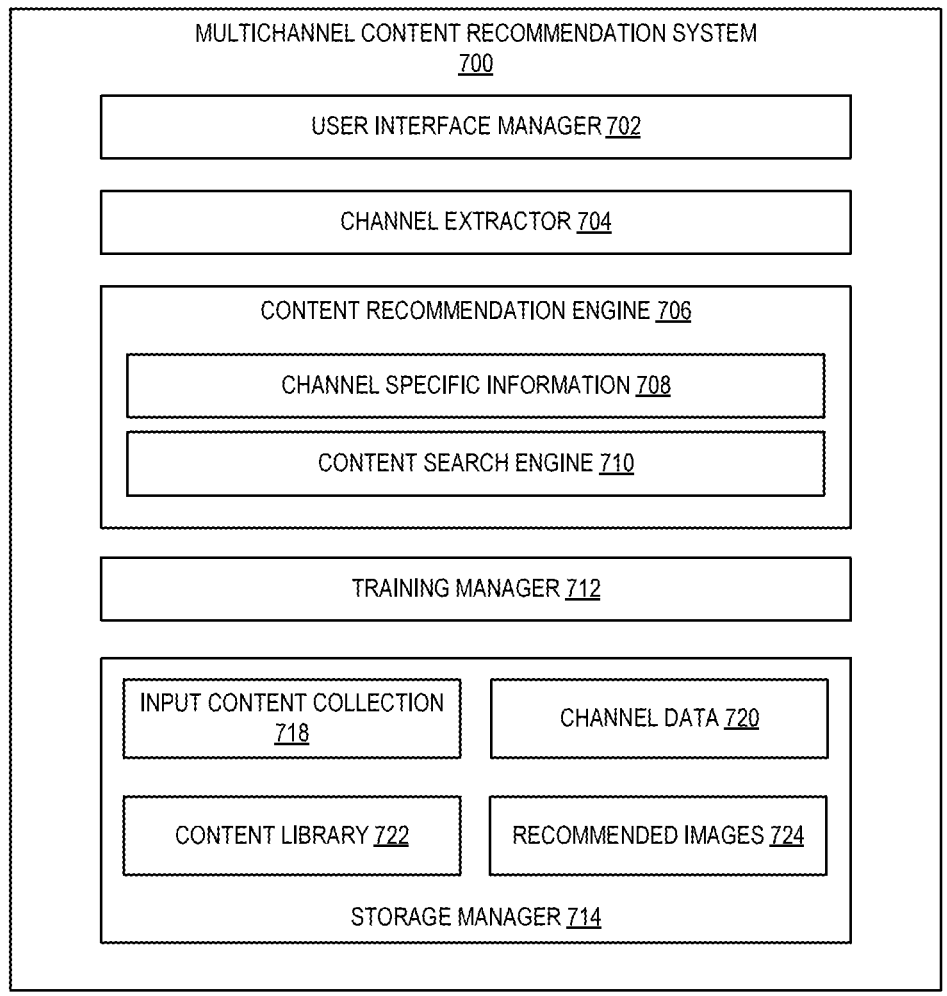
FIG. 7 illustrates a schematic diagram of a multichannel content recommendation system in accordance with one or more embodiments.

FIG. 7 illustrates a schematic diagram of multichannel content recommendation system 700 in accordance with one or more embodiments. As shown, multichannel content recommendation system 700 may include, but is not limited to, a user interface manager 702, a channel extractor 704, a content recommendation engine 706, a training manager 712, and a storage manager 714. The content recommendation engine 706 includes channel specific information 708 and content search engine 710. The multichannel content recommendation system 700 includes storage manager 714 that includes input content collection 718, channel data 720, content library 722, and recommended images 724.

As illustrated in FIG. 7, the multichannel content recommendation system 700 includes a user interface manager 702. For example, the user interface manager 702 allows users to provide sets of images as input collections to the multichannel content recommendation system 700. In some embodiments, the user interface manager 702 provides a user interface through which the user uploads or selects one or more sets of images. Alternatively, or additionally, the user interface may enable the user to select a recording of a set of images, either by providing an address (e.g., a URL or other endpoint) associated with the remote file or connecting to a remote storage (e.g., cloud storage) that includes the set of images. In some embodiments, the user interface manager 702 enables the user to select a set of images from a library of existing images. For example, the user interface may allow the user to select a first input content collection and a second input content collection.

As illustrated in FIG. 7, the multichannel content recommendation system 700 includes a channel extractor 704. The channel extractor 704 generates multiple channels for each image of the input content collection. The channel extractor 704 includes one or more machine learning models that are trained for a task of extracting an object, a style, and a color palette from each image in the input content collection. The channel extractor 704 manipulates the channels to separate information from each channel of the image by applying an orthogonalization process to separate the visual information represented by each channel. A trained neural network is used to generate channel specific features from the input content collection.

As illustrated in FIG. 7, the multichannel content recommendation system 700 includes a content recommendation engine 706. The content recommendation engine 706 includes channel specific information 708 and a content search engine 710. The content recommendation engine 706 computes an intent channel from the channel specific information 708 and performs a search using the content search engine 710.

As further illustrated in FIG. 7, the content recommendation engine 706 includes channel specific information 708. The channel specific information 708 represents object, a style, and a color palette from each image in the input content collection. The content recommendation engine 706 computes an intent channel from the channel specific information 112 by computing a pairwise similarity of the channel specific information 112 along each channel of the collection. The pairwise similarity may indicate that a particular channel such as the object channel, the style channel, or the color channel have a greater similarity than other channels. The content recommendation engine 706 determines that the channel with the greatest similarity across the collection is the intent channel. In some embodiments, the content recommendation engine 706 assigns a weighting factor according to a ratio of the similarities between the channels. For instance, the weighting factor is assigned as described at least with regard to FIG. 3, where the object channel weight factor is 0.654, the style channel weight factor is 0.209, and the color channel weight factor is 0.137.

As further illustrated in FIG. 7, the content recommendation engine 706 includes a content search engine 710. The content search engine 710 is a component of a software application that performs a search of the content library 722 using the channel specific information 708. The content search engine 710 performs the search of the content library 722 with a homogenous intent channel and variable values of non-intent channels. In some examples, more than one channel may be homogenous, such as described above with two input content collections, and accordingly, two channels would be homogenously searched with variation on the remaining channel. Any number or combination of intent channels and total channels can be used.

As illustrated in FIG. 7 the multichannel content recommendation system 700 also includes training manager 712. The training manager 712 can teach, guide, tune, and/or train one or more neural networks. In particular, the training manager 712 can train a neural network based on a plurality of training data (e.g., training input collections and training feature channels). As discussed, the training input collections and training feature channels may include sets of images, such as from a library of images or other source. The set of training feature channels may be used to train the neural networks to extract channel specific feature information. In some embodiments, to more closely replicate the data that will be seen at test time, the training input collections and training feature channels may also be augmented with noise data, as discussed above. More specifically, the training manager 712 can access, identify, generate, create, and/or determine training input and utilize the training input to train and fine-tune a neural network. For instance, the training manager 712 can train the channel extractor 704 or the content recommendation engine, as discussed above.

The storage manager 714, as shown in FIG. 7, includes the input content collection 718. The input content collection 718 includes a set of images. For example, the images can include a variety of objects, a variety of styles, and a variety of color palettes.

As further illustrated in FIG. 7, the storage manager 714 also includes channel data 720. The channel data 720 is a representation of the visual content of the images in the input content collection 718. For example, channel data 720 may be a feature vector extracted from the image. For clarity, the channel data 720 can be raw channel data or processed channel data that is orthogonalized and stored, such as stored channel specific data.

As further illustrated in FIG. 7, the storage manager 714 may also include content library 722. The content library 722 may include a collection of images, such as an image library including many thousands of images from various sources, a smaller image library including hundreds of images from a single or small number of sources, etc. In some examples, the content library 722 may include a cache of a larger library, such as a portion of images from a cloud-based content library.

As further illustrated by FIG. 7, the storage manager 714 may also include recommended images 724. The recommended images 724 represents the retrieved results of the content search engine 710. The recommended images 724 may be stored or presented to the user during operation of the multichannel content recommendation system 700.

Each of the components 702-714 of the multichannel content recommendation system 700 and their corresponding elements (as shown in FIG. 7) may be in communication with one another using any suitable communication technologies. It will be recognized that although components 702-714 and their corresponding elements are shown to be separate in FIG. 7, any of components 702-714 and their corresponding elements may be combined into fewer components, such as into a single facility or module, divided into more components, or configured into different components that may serve a particular embodiment.

The components 702-714 and their corresponding elements can comprise software, hardware, or both. For example, the components 702-714 and their corresponding elements comprise one or more instructions stored on a computer-readable storage medium and executable by processors of one or more computing devices. When executed by the one or more processors, the computer-executable instructions of the multichannel content recommendation system 700 cause a client device and/or a server device to perform the methods described herein. Alternatively, the components 702-714 and their corresponding elements can comprise hardware, such as a special purpose processing device to perform a certain function or group of functions. Additionally, the components 702-714 and their corresponding elements can comprise a combination of computer-executable instructions and hardware.

Furthermore, the components 702-714 of the multichannel content recommendation system 700 may, for example, be implemented as one or more stand-alone applications, as one or more modules of an application, as one or more plug-ins, as one or more library functions or functions that may be called by other applications, and/or as a cloud-computing model. Thus, the components 702-710 of multichannel content recommendation system 700 may be implemented as a stand-alone application, such as a desktop or mobile application. Furthermore, the components 702-710 of the multichannel content recommendation system 700 may be implemented as one or more web-based applications hosted on a remote server. Alternatively, or additionally, the components of the multichannel content recommendation system 700 may be implemented in a suit of mobile device applications or "apps."

Figure 8:
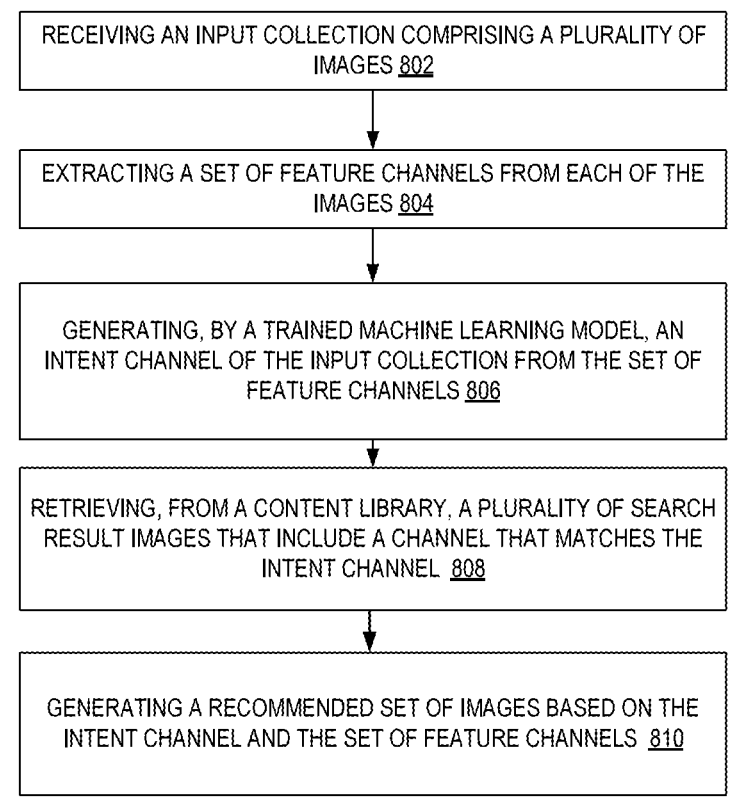
FIG. 8 illustrates a flowchart of a series of acts in a method of multichannel content recommendation in accordance with one or more embodiments.

FIGS. 1-7, the corresponding text, and the examples, provide a number of different systems and devices that perform multichannel content recommendation from one or more sets of input images. In addition to the foregoing, embodiments can also be described in terms of flowcharts comprising acts and steps in a method for accomplishing a particular result. For example, FIG. 8 illustrates a flowchart of an exemplary method in accordance with one or more embodiments. The method described in relation to FIG. 8 may be performed with fewer or more steps/acts or the steps/acts may be performed in differing orders. Additionally, the steps/acts described herein may be repeated or performed in parallel with one another or in parallel with different instances of the same or similar steps/acts.

FIG. 8 illustrates a flowchart 800 of a series of acts in a method of generating a recommended set of images in accordance with one or more embodiments. In one or more embodiments, the method 800 is performed in a digital medium environment that includes the multichannel content recommendation system 700. The method 800 is intended to be illustrative of one or more methods in accordance with the present disclosure and is not intended to limit potential embodiments. Alternative embodiments can include additional, fewer, or different steps than those articulated in FIG. 8.

As illustrated in FIG. 8, the method 800 includes an act 802 of receiving an input collection including a plurality of images. The multichannel content recommendation system can receive the input content collection via the user interface manager. The images can be any known type of electronic file that contains graphic information and may include images from a content server, or uploaded from a client device of the user, such as by a user interface.

In some embodiments, the method 800 includes an act 804 of extracting a set of feature channels from each of the images. The set of feature channels include at least an object channel, a style channel, and a color channel. The set of feature channels can be extracted by a channel extractor. The act 804 of extracting the set of feature channels can include generating channel specific information by manipulating the set of feature channels such as through an orthogonalization process to differentiate channels. Extracting the set of feature channels can include generating a collection representation. The collection representation can be computed by $$C_m^p = \frac{1}{N}\sum_{i \in C} \hat{c}_{mi}^p.$$

The channel representation $C_m^P$, has the same dimensions of the image $\hat{c}_{mi}^p$ for images that are elements (i∈C) of the collection C.

In some embodiments, the method 800 includes an act 806 of generating, by a trained machine learning model, an intent channel of the input collection from the set of feature channels. The content recommendation engine can manipulate the extracted set of feature channels and generate channel specific features by applying a neural network to each channel of the set of feature channels and applying an orthogonal loss constraint to a pair of channels of the set of feature channels. The neural network minimizes an overlap between the pair of channels of the set of feature channels. The content recommendation engine computes a pair-wise similarity score along each feature channel between selected pairs of images of the plurality of images and an average of the pair-wise similarity scores of each feature channel. The act 804 can further include generating a collection representation of the set of features. The content recommendation engine generates a collection intent by comparing the average of the pairwise similarity scores of a first channel and the average of the pairwise similarity scores of a second channel. The average pairwise similarity between images along a particular channel m, can be computed by:

$$\hat{\beta}_m = \frac{1}{N*(N-1)}\sum_{(ij)} sim(\hat{c}_{mi}^\rho, \hat{c}_{mj}^\rho).$$

The intent can be standardized using standardized statistical methods to compare two different images in a collection across the same channel m. The channel weights can also be normalized such that the sum of the weights is set to 1.0.

For example, the content recommendation engine computes a first similarity between a first feature channel of a first image of the plurality of images and a first feature channel of a second image of the plurality of images. The content recommendation engine computes a second similarity between a second feature channel of the first image of the plurality of images and a second feature channel of the second image of the plurality of images. The content recommendation engine compares the first similarity and the second similarity and determines the intent channel based on the comparison of the first similarity and the second similarity.

In some embodiments, the method 800 includes an act 808 of retrieving, from a content library, a plurality of search result images that include a channel that matches the intent channel. The content recommendation engine generates a search query from the channel specific information. The content recommendation engine provides the search query to the content search engine that retrieves a result set of images from the content library based on the search query. In some examples, the content recommendation engine uses two collection representations each including an intent channel to generate the search query.

In some embodiments, the method 800 includes an act 810 of generating a recommended set of images based on the intent channel and the set of feature channels. The content search engine retrieves, from the content library, a set of candidate recommended images having a set of candidate feature channels. The content search engine compares the set of candidate feature channels of each candidate recommended image with the intent channel. The content search engine selects one or more images from the set of candidate recommended images based on the comparison of the intent channel with the set of candidate feature channels.

Figure 9:
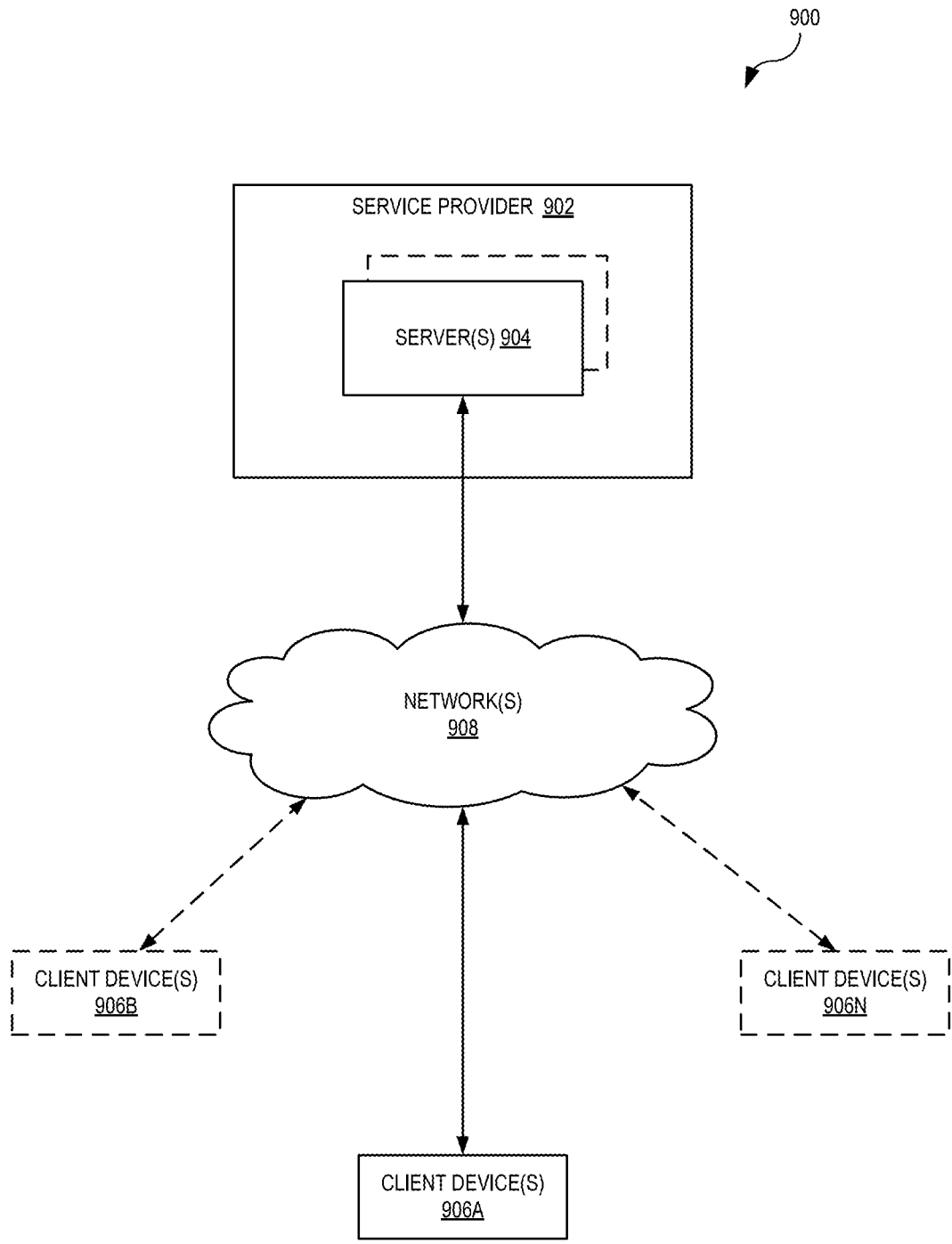
FIG. 9 illustrates a schematic diagram of an exemplary environment in which the multichannel content recommendation system can operate in accordance with one or more embodiments.

FIG. 9 illustrates a schematic diagram of an exemplary environment 900 in which the multichannel content recommendation system 700 can operate in accordance with one or more embodiments. In one or more embodiments, the environment 900 includes a service provider 902 which may include one or more servers 904 connected to a plurality of client devices 906A-906N via one or more networks 908. The client devices 906A-906N, the one or more networks 908, the service provider 902, and the one or more servers 904 may communicate with each other or other components using any communication platforms and technologies suitable for transporting data and/or communication signals, including any known communication technologies, devices, media, and protocols supportive of remote data communications, examples of which will be described in more detail below with respect to FIG. 10.

Although FIG. 9 illustrates a particular arrangement of the client devices 906A-906N, the one or more networks 908, the service provider 902, and the one or more servers 904, various additional arrangements are possible. For example, the client devices 906A-906N may directly communicate with the one or more servers 904, bypassing the network 908. Or alternatively, the client devices 906A-906N may directly communicate with each other. The service provider 902 may be a public cloud service provider which owns and operates their own infrastructure in one or more data centers and provides this infrastructure to customers and end users on demand to host applications on the one or more servers 904. The servers may include one or more hardware servers (e.g., hosts), each with its own computing resources (e.g., processors, memory, disk space, networking bandwidth, etc.) which may be securely divided between multiple customers, each of which may host their own applications on the one or more servers 904. In some embodiments, the service provider may be a private cloud provider which maintains cloud infrastructure for a single organization. The one or more servers 904 may similarly include one or more hardware servers, each with its own computing resources, which are divided among applications hosted by the one or more servers for use by members of the organization or their customers.

Similarly, although the environment 900 of FIG. 9 is depicted as having various components, the environment 900 may have additional or alternative components. For example, the environment 900 can be implemented on a single computing device with the multichannel content recommendation system 700. In particular, the multichannel content recommendation system 700 may be implemented in whole or in part on the client device 902A.

As illustrated in FIG. 9, the environment 900 may include client devices 906A-906N. The client devices 906A-906N may comprise any computing device. For example, client devices 906A-906N may comprise one or more personal computers, laptop computers, mobile devices, mobile phones, tablets, special purpose computers, TVs, or other computing devices, including computing devices described below with regards to FIG. 10. Although three client devices are shown in FIG. 9, it will be appreciated that client devices 906A-906N may comprise any number of client devices (greater or fewer than shown).

Moreover, as illustrated in FIG. 9, the client devices 906A-906N and the one or more servers 904 may communicate via one or more networks 908. The one or more networks 908 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 908 may be any suitable network over which the client devices 906A-906N may access service provider 902 and server 904, or vice versa. The one or more networks 908 will be discussed in more detail below with regards to FIG. 10.

In addition, the environment 900 may also include one or more servers 904. The one or more servers 904 may generate, store, receive, and transmit any type of data, including the input content collection 718, channel data 720, content library 722, recommended images 724, or other information. For example, a server 904 may receive data from a client device, such as the client device 906A, and send the data to another client device, such as the client device 902B and/or 902N. The server 904 can also transmit electronic messages between one or more users of the environment 900. In one example embodiment, the server 904 is a data server. The server 904 can also comprise a communication server or a web-hosting server. Additional details regarding the server 904 will be discussed below with respect to FIG. 10.

As mentioned, in one or more embodiments, the one or more servers 904 can include or implement at least a portion of the multichannel content recommendation system 700. In particular, the multichannel content recommendation system 700 can comprise an application running on the one or more servers 904 or a portion of the multichannel content recommendation system 700 can be downloaded from the one or more servers 904. For example, the multichannel content recommendation system 700 can include a web hosting application that allows the client devices 906A-906N to interact with content hosted at the one or more servers 904. To illustrate, in one or more embodiments of the environment 900, one or more client devices 906A-906N can access a webpage supported by the one or more servers 904. In particular, the client device 906A can run a web application (e.g., a web browser) to allow a user to access, view, and/or interact with a webpage or website hosted at the one or more servers 904.

Upon the client device 906A accessing a webpage or other web application hosted at the one or more servers 904, in one or more embodiments, the one or more servers 904 can provide access to one or more electronic documents 920 stored at the one or more servers 904. Moreover, the client device 906A can receive a request generating a set of recommended images from an input content collection and provide the request to the one or more servers 904. Upon receiving the request, the one or more servers 904 can automatically perform the methods and processes described above to generate a set of recommended images. The one or more servers 904 can provide all or portions of recommended images 724, to the client device 906A for presentation to the user.

As just described, the multichannel content recommendation system 700 may be implemented in whole, or in part, by the individual elements 902-908 of the environment 900. It will be appreciated that although certain components of the multichannel content recommendation system 700 are described in the previous examples with regard to particular elements of the environment 900, various alternative implementations are possible. For instance, in one or more embodiments, the multichannel content recommendation system 700 is implemented on any of the client devices 906A-N. Similarly, in one or more embodiments, the multichannel content recommendation system 700 may be implemented on the one or more servers 904. Moreover, different components and functions of the multichannel content recommendation system 700 may be implemented separately among client devices 906A-906N, the one or more servers 904, and the network 908.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
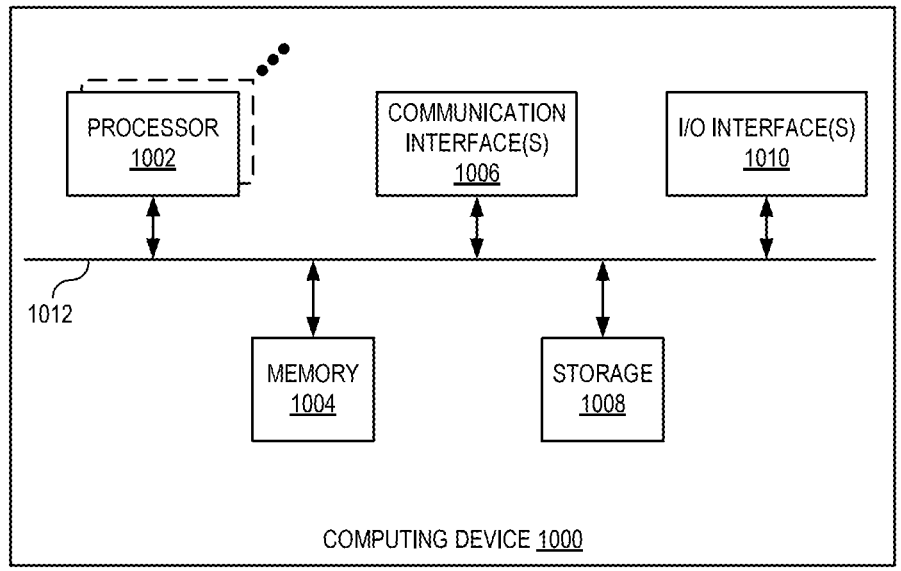
FIG. 10 illustrates a block diagram of an exemplary computing device in accordance with one or more embodiments.

FIG. 10 illustrates, in block diagram form, an exemplary computing device 1000 that may be configured to perform one or more of the processes described above. One will appreciate that one or more computing devices such as the computing device 1000 may implement the multichannel content recommendation system. As shown by FIG. 10, the computing device can comprise a processor 1002, memory 1004, one or more communication interfaces 1006, a storage device 1008, and one or more I/O devices/interfaces 1010. In certain embodiments, the computing device 1000 can include fewer or more components than those shown in FIG. 10. Components of computing device 1000 shown in FIG. 10 will now be described in additional detail.

In particular embodiments, processor(s) 1002 includes hardware for executing instructions, such as those making up a computer program. As an example, and not by way of limitation, to execute instructions, processor(s) 1002 may retrieve (or fetch) the instructions from an internal register, an internal cache, memory 1004, or a storage device 1008 and decode and execute them. In various embodiments, the processor(s) 1002 may include one or more central processing units (CPUs), graphics processing units (GPUs), field programmable gate arrays (FPGAs), systems on chip (SoC), or other processor(s) or combinations of processors.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1004 may be internal or distributed memory.

The computing device 1000 can further include one or more communication interfaces 1006. A communication interface 1006 can include hardware, software, or both. The communication interface 1006 can provide one or more interfaces for communication (such as, for example, packet-based communication) between the computing device and one or more other computing devices 1000 or one or more networks. As an example, and not by way of limitation, communication interface 1006 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can comprise hardware, software, or both that couples components of computing device 1000 to each other.

The computing device 1000 includes a storage device 1008 includes storage for storing data or instructions. As an example, and not by way of limitation, storage device 1008 can comprise a non-transitory storage medium described above. The storage device 1008 may include a hard disk drive (HDD), flash memory, a Universal Serial Bus (USB) drive or a combination of these or other storage devices. The computing device 1000 also includes one or more input or output ("I/O") devices/interfaces 1010, which are provided to allow a user to provide input to (such as user strokes), receive output from, and otherwise transfer data to and from the computing device 1000. These I/O devices/interfaces 1010 may include a mouse, keypad or a keyboard, a touch screen, camera, optical scanner, network interface, modem, other known I/O devices or a combination of such I/O devices/interfaces 1010. The touch screen may be activated with a stylus or a finger.

The I/O devices/interfaces 1010 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1010 is configured to provide graphical data to a display for presentation to a user. The graphical data may be representative of one or more graphical user interfaces and/or any other graphical content that may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A method comprising:
receiving an input collection comprising a plurality of images for searching for a second plurality of images based on the input collection;
extracting a set of feature channels from each of the images;
generating, by a trained machine learning model, an intent channel of the input collection from the set of feature channels;
retrieving, from a content library, a search result comprising the second plurality of images, the second plurality of images including a channel that matches the intent channel; and
generating a recommended set of images based on the intent channel and the set of feature channels.

2. The method of claim 1, wherein generating the intent channel of the input collection from the set of feature channels comprises:
computing a first similarity between a first feature channel of a first image of the plurality of images and a first feature channel of a second image of the plurality of images;
computing a second similarity between a second feature channel of the first image of the plurality of images and a second feature channel of the second image of the plurality of images;
comparing the first similarity and the second similarity; and
determining the intent channel based on the comparison of the first similarity and the second similarity.

3. The method of claim 2 wherein generating a recommended set of images based on the intent channel and the set of feature channels comprises:
retrieving, from the content library, a set of candidate images, wherein each candidate image has a set of candidate feature channels;
comparing the intent channel with the set of candidate feature channels;
comparing the first feature channel or the second feature channel with the set of candidate feature channels; and
selecting, from the set of candidate images, one or more recommended images based on the comparison of the intent channel with the set of candidate feature channels and the comparison of the first feature channel or the second feature channel with the set of candidate feature channels.

4. The method of claim 1 wherein extracting a set of feature channels from each of the images comprises:
generating channel specific features for the set of feature channels by:
applying a first neural network to each channel of the set of feature channels;
applying an orthogonal loss constraint to a pair of channels of the set of feature channels; and
minimizing an overlap between the pair of channels of the set of feature channels.

5. The method of claim 4, further comprising:
computing a pair-wise similarity score along each feature channel between selected pairs of images of the plurality of images;
computing an average of the pair-wise similarity scores of each feature channel; and
generating a collection intent by comparing the average of the pair-wise similarity scores of a first channel and the average of the pair-wise similarity scores of a second channel.

6. The method of claim 1, wherein the set of feature channels comprises an object channel, a style channel, and a color channel.

7. The method of claim 1 further comprising:
receiving a second input collection comprising a third plurality of images for searching for the second plurality of images based on the input collection and the second input collection;
extracting a second set of feature channels from each of the images in the second input collection;
generating, by a trained machine learning model, a second intent channel of the second input collection from the second set of feature channels;
retrieving, from the content library, the search result comprising the second plurality of images, the second plurality of images including a first channel that matches the intent channel of the input collection and a second channel that matches a second intent channel of the second input collection; and
generating a recommended set of images based on the first intent channel and the second intent channel.

8. The method of claim 7 further comprising:
retrieving, from the content library, a set of candidate images;
comparing the intent channel with a set of candidate feature channels;

comparing the second intent channel with the set of candidate feature channels; and
selecting, from the set of candidate images, one or more recommended images based on the comparison of the intent channel and the second intent channel with the set of candidate feature channels, wherein the intent channel and the second intent channel are different channels.

9. The method of claim 1, the method further comprising training the trained machine learning model, the training comprising:
receiving a collection of training images including one or more training feature channels and a set of channel specific features into a machine learning model; and
training the machine learning model using the collection of training images including one or more training feature channels to generate a collection representation including an intent channel based at least on the one or more training feature channels and the set of channel specific features.

10. The method of claim 9, wherein the set of channel specific features are an orthogonalized representation for each channel of the one or more training feature channels for an image of the collection of training images.

11. A system comprising:
a memory component; and
a processing device coupled to the memory component, the processing device to perform operations comprising:
receiving an input collection comprising a plurality of images for searching for a second plurality of images based on the input collection;
extracting a set of feature channels from each of the images;
generating, by a trained machine learning model, an intent channel of the input collection from the set of feature channels;
retrieving, from a content library, a search result comprising the second plurality of images, the second plurality of images including a channel that matches the intent channel; and
generating a recommended set of images based on the intent channel and the set of feature channels.

12. The system of claim 11, wherein the operations for generating the intent channel of the input collection from the set of feature channels cause the processing devices to perform operations comprising:
computing a first similarity between a first feature channel of a first image of the plurality of images and a first feature channel of a second image of the plurality of images;
computing a second similarity between a second feature channel of the first image of the plurality of images and a second feature channel of the second image of the plurality of images;
comparing the first similarity and the second similarity; and
determining the intent channel based on the comparison of the first similarity and the second similarity.

13. The system of claim 12, wherein the operations for generating a recommended set of images based on the intent channel and the set of feature channels cause the processing device to perform operations comprising:
retrieving, from the content library, a set of candidate images, wherein each candidate image has a set of candidate feature channels;
comparing the intent channel with the set of candidate feature channels;
comparing the first feature channel or the second feature channel with the set of candidate feature channels; and
selecting, from a set of candidate images, one or more recommended images based on the comparison of the intent channel with the set of candidate feature channels and the comparison of the first feature channel or the second feature channel with the set of candidate feature channels.

14. The system of claim 11, wherein the operations for extracting a set of feature channels from each of the images cause the processing device to perform operations comprising:
generating channel specific features for the set of feature channels by:
applying a first neural network to each channel of the set of feature channels;
applying an orthogonal loss constraint to a pair of channels of the set of feature channels; and
minimizing an overlap between the pair of channels of the set of feature channels.

15. The system of claim 11, the operations further comprising:
computing a pair-wise similarity score along each feature channel between selected pairs of images of the plurality of images;
computing an average of the pair-wise similarity scores of each feature channel; and
generating a collection intent by comparing the average of the pair-wise similarity scores of a first channel and the average of the pair-wise similarity scores of a second channel.

16. The system of claim 11, wherein the set of feature channels comprises an object channel, a style channel, and a color channel.

17. The system of claim 11, the operations further comprising:
receiving a second input collection comprising a third plurality of images for searching for the second plurality of images based on the input collection and the second input collection;
extracting a second set of feature channels from each of the images in the second input collection;
generating, by a trained machine learning model, a second intent channel of the second input collection from the second set of feature channels;
retrieving, from the content library, the search result comprising the second plurality of images, the second plurality of images including a first channel that matches the intent channel of the input collection and a second channel that matches a second intent channel of the second input collection; and
generating a recommended set of images based on the first intent channel and the second intent channel.

18. The system of claim 17, the operations further comprising:
retrieving, from the content library, a set of candidate images;
comparing the intent channel with a set of candidate feature channels;
comparing the second intent channel with the set of candidate feature channels; and
selecting, from the set of candidate images, one or more recommended images based on the comparison of the intent channel and the second intent channel with the set of candidate feature channels, wherein the intent channel and the second intent channel are different channels.

19. A method comprising:

receiving an input collection comprising a plurality of images for searching for a second plurality of images based on the input collection;

extracting a set of feature channels from each of the images;

generating, by a trained machine learning model, an intent channel of the input collection from the set of feature channels, wherein the trained machine learning model is trained by:

receiving a collection of training images including one or more training feature channels and a set of channel specific features into a machine learning model; and training the machine learning model using the collection of training images including one or more training feature channels to generate a collection representation including an intent channel based at least on the one or more training feature channels and the set of channel specific features:

retrieving, from a content library, a search result comprising the second plurality of images, the second plurality of images including a channel that matches the intent channel; and generating a recommended set of images based on the intent channel and the set of feature channels.

20. The method of claim 19, wherein the set of channel specific features are an orthogonalized representation for each channel of the one or more training feature channels for an image of the collection of training images.

* * * * *